US008782544B2

(12) United States Patent
Hibi

(10) Patent No.: US 8,782,544 B2
(45) Date of Patent: Jul. 15, 2014

(54) DISPLAY CONTROL APPARATUS, DISPLAY CONTROL METHOD, AND STORAGE MEDIUM

(75) Inventor: Makoto Hibi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 13/268,201

(22) Filed: Oct. 7, 2011

(65) Prior Publication Data

US 2012/0096376 A1  Apr. 19, 2012

(30) Foreign Application Priority Data

Oct. 14, 2010  (JP) ................................. 2010-231638

(51) Int. Cl.
*G06F 3/048* (2013.01)
*G06F 3/033* (2013.01)

(52) U.S. Cl.
USPC ............................ 715/765; 715/764; 715/863

(58) Field of Classification Search
USPC ......................................... 715/765, 764, 863
See application file for complete search history.

(56) References Cited

U.S. PATENT DOCUMENTS

| 5,910,800 | A  | * | 6/1999  | Shields et al. ................. 715/711 |
| 6,028,271 | A  | * | 2/2000  | Gillespie et al. ............ 178/18.01 |
| 6,073,036 | A  | * | 6/2000  | Heikkinen et al. .......... 455/550.1 |
| 7,587,683 | B2 | * | 9/2009  | Ito et al. ........................ 715/823 |
| 7,614,008 | B2 | * | 11/2009 | Ording ........................... 715/773 |
| 7,812,826 | B2 | * | 10/2010 | Ording et al. .................. 345/173 |
| 7,856,605 | B2 | * | 12/2010 | Ording et al. ................. 715/856 |
| 7,934,156 | B2 | * | 4/2011  | Forstall et al. ................. 715/255 |
| 8,539,385 | B2 | * | 9/2013  | Capela et al. .................. 715/863 |
| 8,539,386 | B2 | * | 9/2013  | Capela et al. .................. 715/863 |
| 8,612,884 | B2 | * | 12/2013 | Capela et al. .................. 715/800 |
| 2008/0278455 | A1 | * | 11/2008 | Atkins et al. ................... 345/173 |
| 2010/0023858 | A1 |   | 1/2010  | Ryu et al. |
| 2010/0156813 | A1 | * | 6/2010  | Duarte et al. .................. 345/173 |
| 2010/0231533 | A1 | * | 9/2010  | Chaudhri ....................... 345/173 |
| 2012/0069056 | A1 |   | 3/2012  | Ito |
| 2012/0289290 | A1 | * | 11/2012 | Chae et al. .................... 455/566 |

FOREIGN PATENT DOCUMENTS

| JP | 09-160699 A | 6/1997 |
| JP | 4701314 B1 | 6/2011 |

OTHER PUBLICATIONS

Office Action dated Apr. 30, 2014, in Japanese Patent Application No. 2010-231638.

* cited by examiner

*Primary Examiner* — David Phantana Angkool
(74) *Attorney, Agent, or Firm* — Fitzpatrick, Cella, Harper & Scinto

(57) ABSTRACT

A display control apparatus specifies a position on a display screen that is specified by the user according to an instruction from the user, and displays information on the display screen that is set by the specified first position and second position and indicates data to be displayed from among a plurality of items of data on the display screen. When the user further specifies a third position, the display control apparatus determines whether an instruction from the user for specifying the third position is a specified instruction that differs from an instruction for specifying the second position. When it is determined that the instruction is the specified instruction, the display control apparatus displays data, from among the plurality of items of data, that corresponds to the information displayed on the display screen.

20 Claims, 14 Drawing Sheets

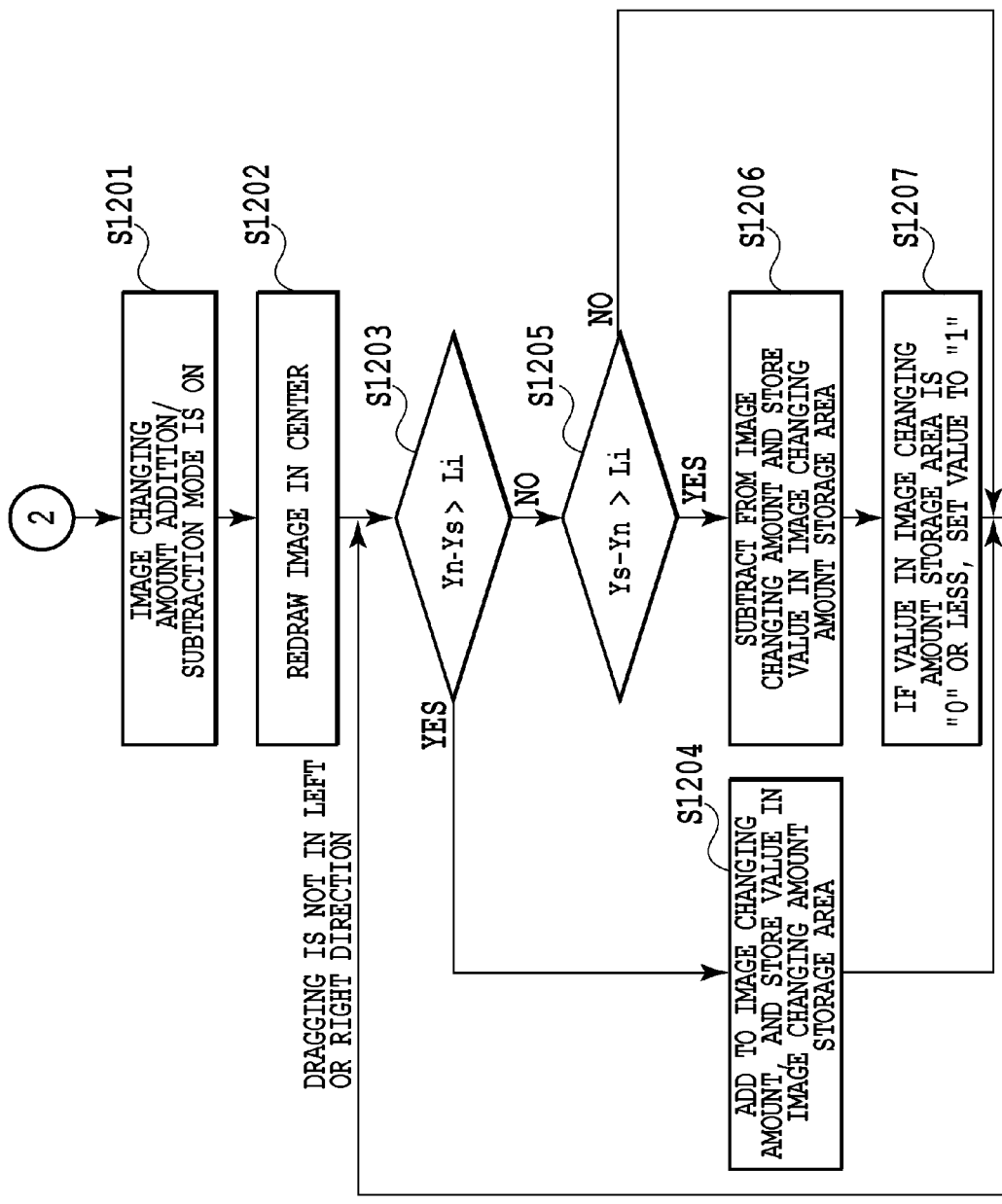

DISPLAY CONTROL APPARATUS, DISPLAY CONTROL METHOD, AND STORAGE MEDIUM

BACKGROUND OF THE INVENTION

1. Field of the Invention

The present invention relates to a display control method that displays data for a display object according to an instruction from a user, and to a program thereof.

2. Description of the Related Art

As technology for setting an image to be displayed on a display device, technology is known where, with images displayed on a display screen, a user can set the image to be displayed (hereafter, this is also referred to as "Image changing") by performing a left or right dragging operation.

As this kind of technology, Japanese Patent Laid-Open No. H09-160699(1997) discloses technology of switching an image of the number of pages according to the distance dragged in the dragging operation.

However, in the technology disclosed in Japanese Patent Laid-Open No. H09-160699(1997), there is a problem in that a user can only perform an image changing instruction intuitively according to the distance dragged. More specifically, in Japanese Patent Laid-Open No. H09-160699(1997), only the dragged distance corresponds to determining the number of pages of image changing or identifying a target image. Therefore, if it is not possible for a user to clearly know the amount of image changing that corresponds to the dragged distance, it becomes difficult to determine the number of changed images. Consequently, it is difficult for the user to determine an image to be displayed, and thus it may not be possible to display a desired image.

SUMMARY OF THE INVENTION

An object of the present invention is to provide a display control apparatus, a display control method, and a storage medium that are capable of easily displaying a desired image by simplifying the identification of an image to be displayed when a user displays an image on a display screen by performing an instruction.

In a first aspect of the present invention, there is provided a display control apparatus comprising: a specifying unit configured to specify a position on a display screen which is designated by a user, according to instructions by the user; a first display control unit configured to cause information prepared based on first and second positions on the display screen which are specified by the specifying unit, the information denoting data to be displayed among a plurality of data, to be displayed on the display screen; a determination unit configured to, if the specifying unit specifies a third position on the display screen according to the user's instructions based on the information displayed by the first display control unit, determine whether or not the user's instructions for designating the third position is predetermined instructions that are different from instructions for designating the second position, based on the second and third positions on the display screen; and a second display control unit configured to, if the determination unit determines that the user's instructions for designating the third position is the predetermined instructions, cause data corresponding to the information displayed by the first display control unit, among the plurality of data to be displayed on the display screen.

In a second aspect of the present invention, there is provided a display control method comprising the steps of: specifying a position on a display screen which is designated by a user, according to instructions by the user; causing information prepared based on first and second positions on the display screen which are specified by the specifying step, the information denoting data to be displayed among a plurality of data, to be displayed on the display screen; if the specifying step specifies a third position on the display screen according to the user's instructions based on the information displayed by the first display control step, determining whether or not the user's instructions for designating the third position is predetermined instructions that are different from instructions for designating the second position, based on the second and third positions on the display screen; and if the determination step determines that the user's instructions for designating the third position is the predetermined instructions, causing data corresponding to the information displayed by the first display control step, among the plurality of data to be displayed on the display screen.

With the configuration described above, a user is able to easily identify an image to be displayed and display a desired image when displaying an image on a display screen.

Further features of the present invention will become apparent from the following description of exemplary embodiments (with reference to the attached drawings).

DESCRIPTION OF THE EMBODIMENTS

In the following, embodiments of the present invention will be explained in detail with reference to the drawings.

Figure 1:
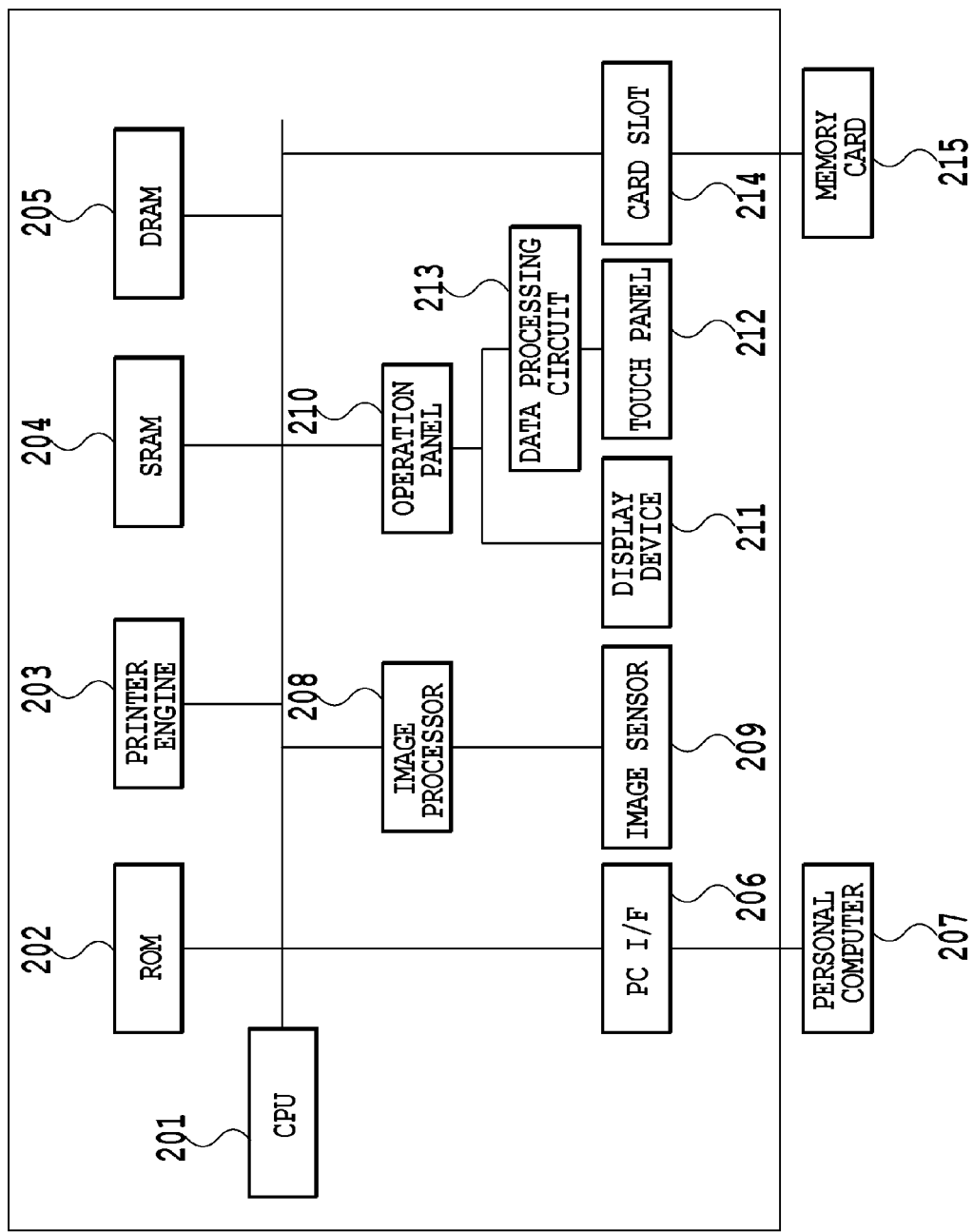
FIG. 1 is a block diagram illustrating the construction of an MFP of one embodiment of the present invention.

FIG. 1 is a block diagram illustrating the configuration of an MFP (multifunction peripheral) according to one embodiment of the present invention. This MFP is an apparatus having a scanning function, printing function, and card-direct function.

In FIG. 1, a CPU 201 is a system control unit for the MFP and performs overall control of the MFP. A ROM 202 stores a system control program for processing by the MFP that will be described later using FIG. 8A to FIG. 11. The CPU 201 executes various operations of the MFP based on the control program that is stored in the ROM 202. Such a control program for the CPU 201 is not limited to being stored in the ROM 202, but could also be stored on an external memory medium such as a floppy (registered trademark) disk, or CD-ROM. Furthermore, this program may be taken by a special reading device into a RAM of the MFP (for example, an SRAM 204), and using that RAM as a work area, the CPU 201 may execute the control program. The SRAM 204 is mainly a memory for storing registered data and the like of the MFP, and a DRAM 205 is mainly a memory for storing image data.

A printer engine 203 prints an inputted digital image onto a printing medium such as printing paper. A PC I/F 206 is an interface that connects the MFP with a personal computer 207, and the personal computer 207, by way of the PC interface 206, is used to change data on various settings of the MFP and perform requests to start various operations of the MFP. An image processor 208 performs various image processing of image data that is inputted by an image sensor 209. The image sensor 209 is a so-called scanner unit, and an image reading unit such as a contact-type reading sensor for reading an image on a document. An operation panel 210 comprises a power switch (not illustrated in the figure), as well as comprises a display device 211 for displaying the operating status or status of various parts of the MFP, and a touch panel 212 that is located on the display device 211. By operating the touch panel 212 while looking at the display device 211, a user inputs instructions and registers various kinds of data. It is also possible to check the status of the device via the display device 211. Furthermore, a dragging operation that will be described later with reference to the figures starting from FIG. 3 and the display according to the dragging operation are performed on the touch panel 212.

A card slot 214 is an interface for connecting a memory card 215. With a memory card 215 connected, the user can use the touch panel 212 and display device 211 to select and view an arbitrary image from among digital images that are stored on the memory card 215. The digital image that was selected by the user is analyzed by the CPU 201 and printed when necessary by the printer engine 203. When doing this, the DRAM 205 is used as a printing buffer. Moreover, in order to improve a printing speed, all of the digital images may be adapted to be taken into the DRAM 205.

Next, the operation and processing for operating the display device 211 and touch panel 212 described above to select and view an arbitrary image from among the digital images that are stored on the memory card 215 will be explained.

Figure 2:
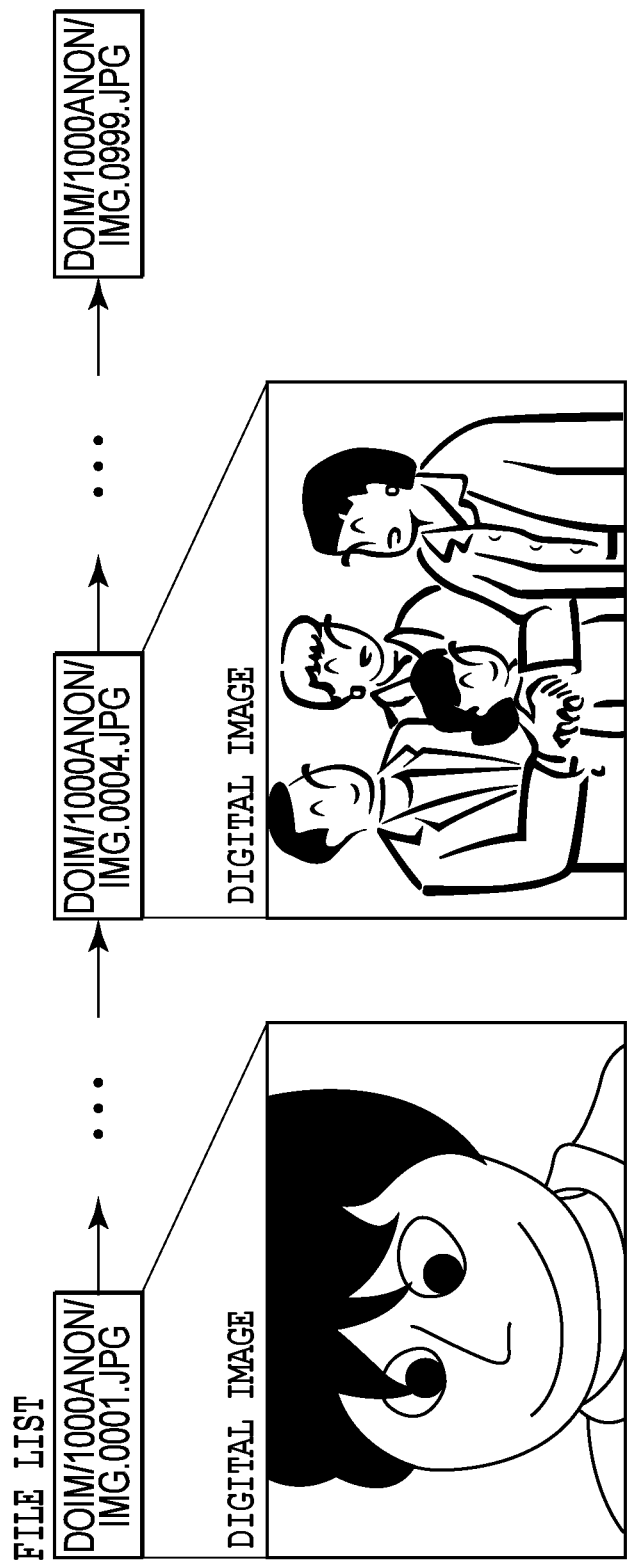
FIG. 2 is a diagram explaining the state in which a memory card is connected to the MFP of the embodiment, and digital images on the memory card are read to arrange files.

In one embodiment of the present invention, the digital image is expanded and then displayed or printed in the generally used JPEG format, which is employed when saving a digital image that is taken by a digital camera. When the memory card 215 is connected, files in JPEG format are detected from among the files that are stored on the memory card. A file list as illustrated in FIG. 2 is then generated based on the digital images in JPEG format that were detected. This file list is arranged so that the image included in that file name having the smallest number is first. This is because generally naming of image data taken by a digital camera is in accordance to the naming rule of the DCF (Design rule for Camera File system) standard. According to this naming rule, the numbers included in file names of images taken after this increase. Therefore, it is possible to determine that the smaller the number, the older (taken earlier in time) the digital image is. In the explanation above, the file list is generated in order of numbers in the file name; however, the digital image file names may be arranged in alphabetical order. Alternatively, it is also possible to analyze the digital data and arrange the files so that the file with the earliest date based on date information that is recorded in the Exif tag of the file is listed first. Furthermore, the file list may be generated by setting the file order according to the date the file was created or updated, which is attached to the image file. In any of these methods, a person normally remembers events in chronological order, so from the aspect of searchability, the file list is preferably arranged in the chronological order that the images were taken. However, in addition to chronological order, the file list may be generated in the order of various kinds of information such as the type of imaging device used to take the images, the location where the images were taken, the scene of the images taken, information set by the user for the file, and the like.

Figure 3:
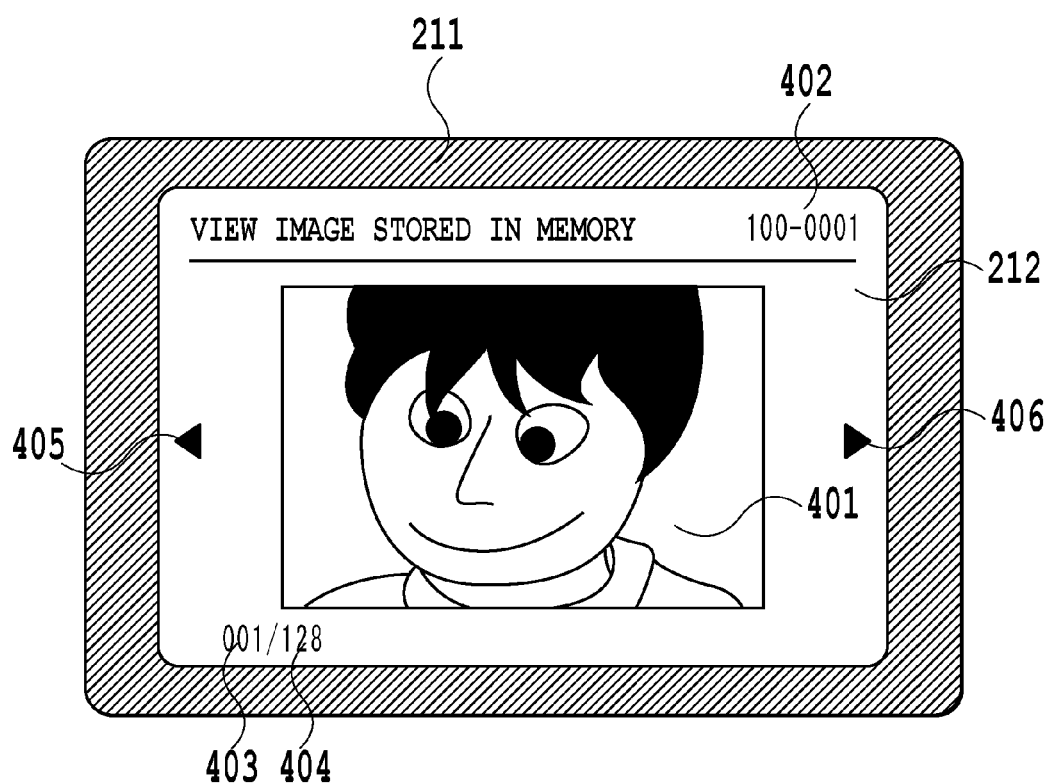
FIG. 3 is a diagram illustrating the state in which a digital image is displayed on the display device and touch panel of the embodiment.

After the file list has been generated, then, as illustrated in FIG. 3, the digital image at a head of the file list, or in other words, the oldest digital image is displayed on the display device 211. FIG. 3 illustrates that the digital image 401, which is the head of the file list, is displayed on the display device 211. As illustrated in FIG. 3, in addition to the digital image 401, the DFC number 402 of the displayed image is displayed on the upper right of the display screen of the display device 211. This DCF number 402 is a number assigned to the image according to the naming rule of the DFC standard mentioned above. Similarly, at the lower left of the display screen a file number 403 that is uniquely assigned to the displayed image by the MFP device, and the length of the file list, or in other words, the total number 404 of JPEG file data that was detected on the memory card 215 are displayed. Furthermore, a forward changing button 406 is located on the right side of the displayed digital image 401, and a backward changing button 405 is located on the left side. By touching these "forward changing" and "backward changing" buttons 406, 405, it is possible to display the next image or the previous image in the file list. For example, when it is desired to switch to the next newer digital image than the displayed digital image, the forward changing button 406 is touched. Similarly, by touching the backward changing button 405, it is possible to switch to the previous older digital image. In this way, in the MFP of this embodiment, by connecting the memory card 215 and operating the touch panel, it is possible to view the images that are stored on the memory card 215.

Figure 4A:
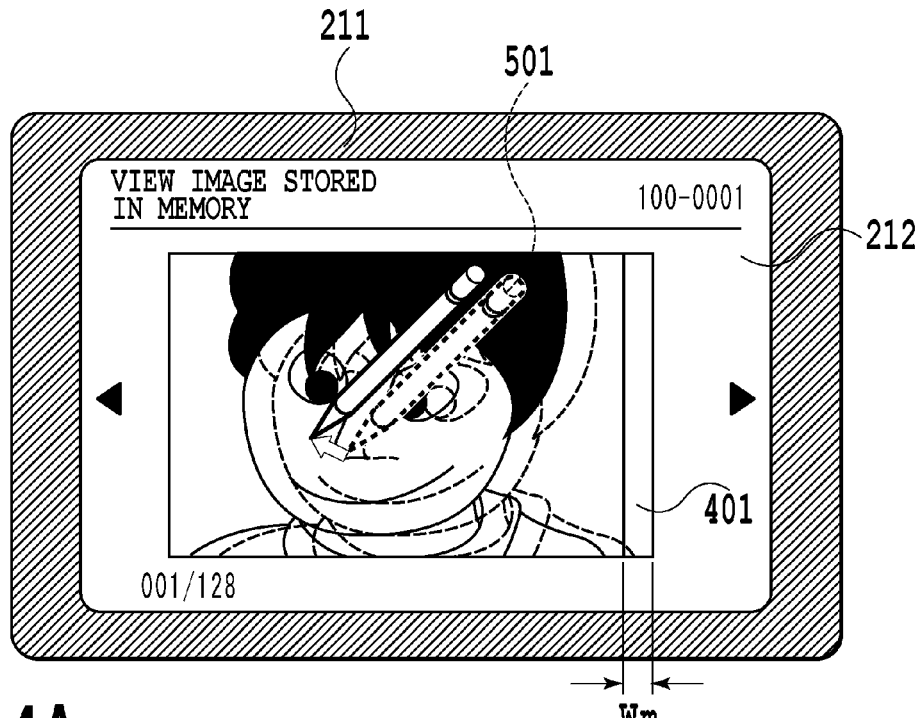
FIGS. 4A and 4B are diagrams illustrating the display state when a digital image that is displayed on the display device of the embodiment is dragged to the left or right on the touch panel.
Figure 4B:
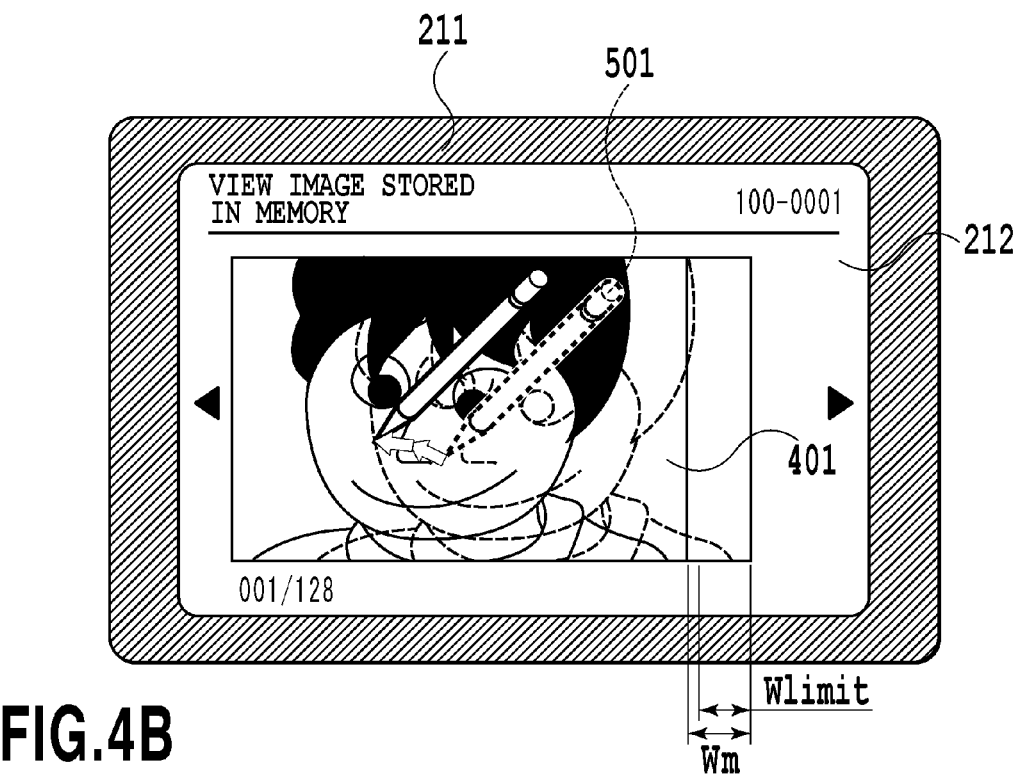

In this embodiment, in addition to switching an image as explained above, the user is able to switch the image by performing the dragging operation. FIGS. 4A and 4B are diagrams explaining the basic construction for switching an image, and illustrate display states when the displayed digital image is dragged in the left or right direction.

FIG. 4A illustrates a transient state in which touching an arbitrary point on the digital image 401 with a touch pen 501 or the like is performed and the dragging operation to the left is performed. When the dragging operation is effective, the digital image follows the dragging operation and moves. In the figure, a reference sign Wm indicates a movement amount of the digital image in the horizontal direction. FIG. 4B illustrates a state after the dragging operation advances in the left direction from the state illustrated in FIG. 4A. In this state, when the touch pen 501 is removed from the touch panel 212, the amount of movement Wm at that point is compared with an image changing determination amount Wlimit that is stored in the ROM 202 beforehand. In this determination, when Wm>Wlimit, image changing is performed and the image is switched. On the other hand, when Wm≤Wlimit, the digital image 401 returns to the original central position, and image changing is not performed. In this way, the display control detects an input position on the display screen that is inputted by a touch pen as an input device, and according to the movement over the display screen of this detected input position, switches the displayed image to one of a plurality of images.

In this embodiment, "dragging" is an operation in which a user performs a specified operation, and while maintaining that state, moves a position from the position where the specified operation was performed. For example, a user contacts the touch panel with a finger, touch pen or the like, and while maintaining that state of contact, moves the touch pen, and thereby the user can perform the "dragging" above. When this "dragging" operation is performed, in the example illustrated in FIG. 4A for example, the image follows the finger or touch pen and moves. To explain the processing at this time, first, the contact of the finger or touch pen on the touch panel is detected, and position information that indicates the position on the touch panel that is being touched is obtained. Then, as the touch pen moves, that position information is updated. As a result, it is possible to determine the distance and direction from the position on the touch panel that the user touched, and the track of movement while the user maintains the contact. In the example illustrated in FIG. 4A, when the user moves the position while maintaining the contact, the image is moved according to the distance and direction from the position of the contact on the touch panel.

The reason for providing an allowable range based on the determined amount in the dragging operation as described above is because even though the user may intend to continuously touch a certain location, there may be a small amount of movement that would become a dragging operation. In other words, by providing this range, it is possible to prevent the user from performing unintentional image changing. In the case of backward image changing, by simply reversing left and right in the explanation above, the same operation is performed for comparing the movement amount Wm and the image changing determination amount Wlimit. Here, the dragging direction for the image changing is taken to be left or right, however, it may be the up or down direction. That is, the explanation above is for the case of configuration where the file list is arranged from left to right, and the touch and dragging operation are performed in the left or right direction, however, configuration may be such that the file list is arranged from top to bottom. In that case, a digital image is adapted to be switched by a dragging operation in the up or down direction.

Figure 5A:
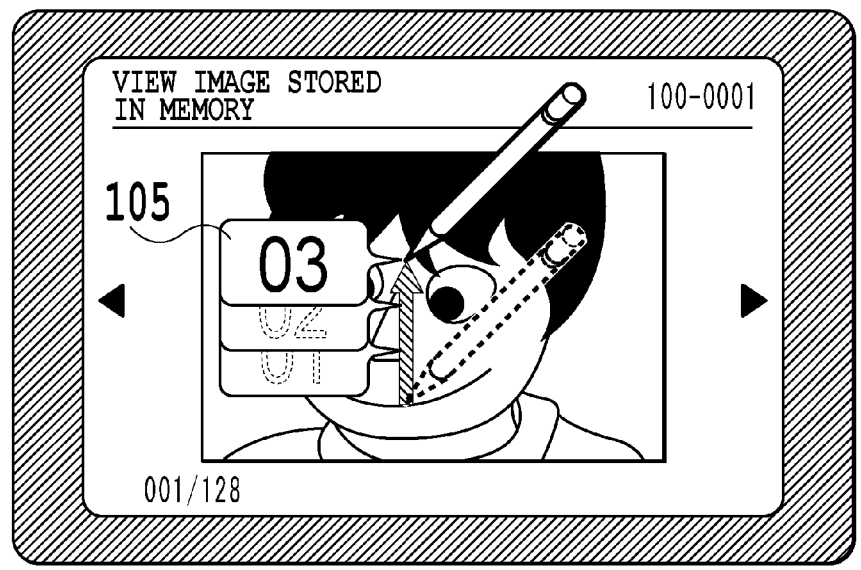
FIGS. 5A to 5C are diagrams explaining image changing of one embodiment of the present invention.
Figure 5B:
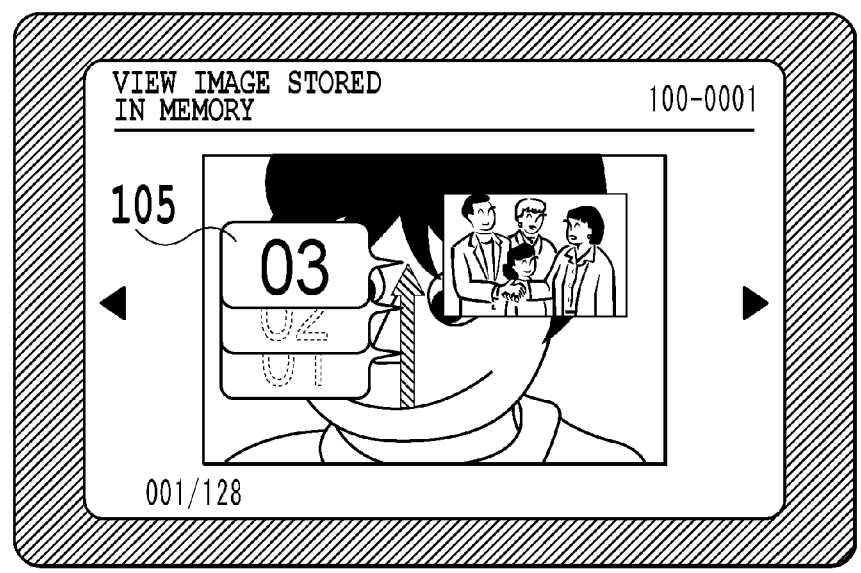
Figure 5C:
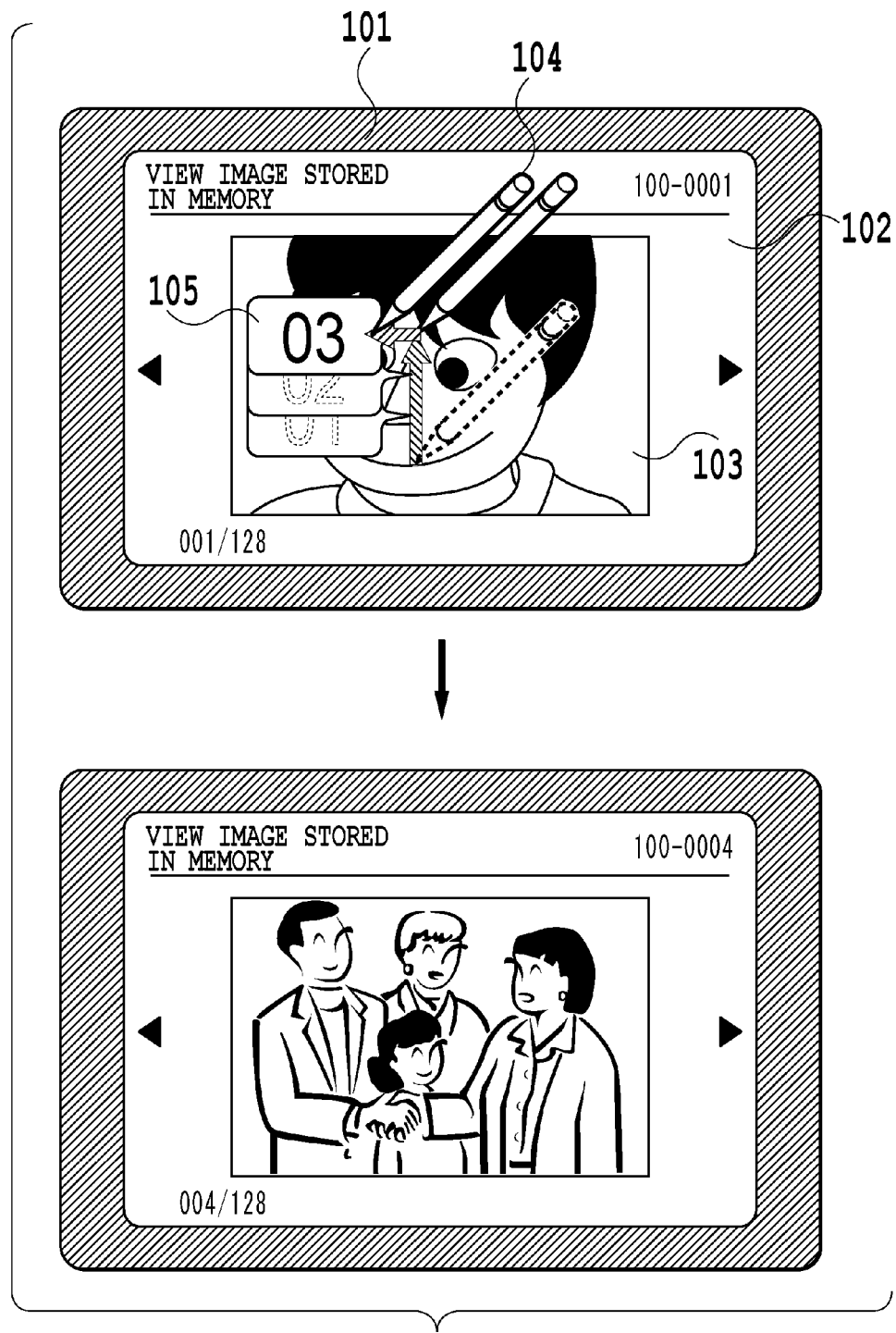

FIGS. 5A to 5C are diagrams explaining the image changing according to one embodiment of the present invention.

FIG. 5A illustrates the state after performing the dragging operation in the up direction before forward or backward changing of the digital image 401. As illustrated in FIG. 5A, in the dragging operation of this embodiment, first, by dragging the image in the up direction, the number of images for the image changing is set. In other words, by dragging the displayed image in the up direction, the number of images to be changed is added according to the dragged distance and the result is displayed. As a result, when performing the dragging operation, the user is able to know from the number display how many images will be changed, and is able correctly adjust the number of images. In the explanation above, an example of performing the dragging operation in the up direction was given, however, when performing image changing by subtracting the number of images from the displayed image, the image is dragged in the down direction. That is, in this embodiment, it is possible to increase or decrease the number of images to be changed by dragging the image in the up or down direction, and in that case, the user is able to know from the number display the final number of images to be changed as the result of increasing or decreasing the number. Moreover, not being limited to this example, it is also possible to add or subtract the number of images to be changed and to display that number by performing the dragging operation in the left or right direction.

Furthermore, in this embodiment, as illustrated in FIG. 5B, a destination image according to the number of images is displayed as a thumbnail image. In the example illustrated in FIG. 5B, the state in which the first image in the file list (IMG_0001.JPG) is displayed is illustrated, and when the dragging operation is performed in the up direction and the number of images to be changed becomes three, the thumbnail image of the fourth image (IMG_0004.JPG) is displayed.

In the example illustrated in FIG. 5B, in the case where the first image in the file list is displayed, the thumbnail image of the destination image in the added direction (image having a larger number in the file list) is displayed. However, when the dragging operation in the down direction (subtraction direction) is performed, if there is an image in this subtraction direction, of course the thumbnail image of that image is displayed.

In this way, in this embodiment, according to the dragging movement in the up direction or down direction of the input position of the touch pen or the like on the display screen, the number of images to be changed associated with switching the image or a thumbnail image display is performed according to the distance moved. Moreover, according to changing of the touch pen or the like on the display screen, for example, according to a dragging operation in the left or right direction of the input position, the image to be switched is displayed.

With the embodiment described above, the number of images to be changed is displayed according to a dragged distance when performing the dragging operation in the up direction. As a result, the user can know directly, while performing the dragging operation, the number of images to be changed. Moreover, by displaying the thumbnail image of the destination image of the image changing, it becomes easy to directly identify the target image while performing the dragging operation. Together with this, as the dragging operation is performed, the thumbnail image of the destination image changes, so it is possible to know the dragging distance for displaying a desired image.

Furthermore, in this case, when performing the dragging operation in the up or down direction, the number of images instead of the image is displayed as information indicating the image that is the target image. Therefore, when compared with the case of displaying an image, it is possible to suppress a processing load for the display, as well as it is possible to provide the user with the image that is the target image. Moreover, the thumbnail image displays the same content as a normally displayed image, however, the number of pixels is less than the normally displayed image, and the amount of data is also less. Therefore, even when the user displays a thumbnail image while performing the dragging operation in the up or down direction, when compared with displaying an image having a large amount of data, it is possible to suppress the processing load for the display, as well as it is possible to provide the user with the content of the image that is the target image.

In the embodiment above, a thumbnail image of the destination image is displayed together with the number of images to be changed, however, it is also possible to display just one of the number of images to be changed or a thumbnail image of the destination image. By displaying one of these, as described above, it is possible to easily know information that corresponds to the amount of image advance according to the dragged distance.

Furthermore, in this embodiment, as illustrated in FIGS. 5A and 5B, after the number of images to be changed has been adjusted by performing the dragging operation in the up direction, then, as illustrated in FIG. 5C, the dragging operation is performed a specified amount or more in the left direction. After that, when the touch pen is removed, the image changing in the forward direction of the displayed number of images is performed (to the image of the displayed thumbnail image), and the destination image is displayed. Similarly, after the number of images to be changed has been adjusted by performing the dragging operation in the down direction, the dragging operation is performed a specified amount or more in the right direction, and then by removing the touch pen, the image changing in the backward direction of the displayed number of images is performed.

It is here assumed that, when the dragging operation is performed in the right direction, which corresponds to backward changing, after the dragging operation has been performed in the up (addition) direction, image changing is not executed. It is also assumed that, when the dragging operation is performed in the left direction, which corresponds to forward changing, after performing the dragging operation in the down (subtraction) direction, image changing is not executed. When dragging is performed in these directions for which image changing is not executed, the dragged image returns to the center of the display screen, and the image changing processing is cancelled.

Moreover, in this embodiment, when the dragging operation is performed in the left or right direction after the dragging operation in the up or down direction has been completed, image changing is performed. Therefore, switching between adjustment of the amount of image changing and execution of image changing can be made by performing the dragging operation in different directions. Consequently, by the user completing the wrong dragging operation, for example, while adjusting the image changing amount, it is possible to prevent the user from unintentionally executing image changing. Furthermore, in this embodiment, after the dragging operation has been performed in the up or down direction, when the touch pen or the like is removed from the touch panel without performing the dragging operation in the left or right direction after the dragging operation had been respectively performed in the left or right direction, image changing of the displayed number or the like is cancelled. FIG. 5C illustrates the state after performing the dragging operation continuously from the state in FIG. 5A (dragging operation in the up direction), or in other words, after performing the dragging operation toward the left as is without removing the touch pen 104 from the touch panel 102. In this way, the dragging operation toward the left causes image changing to be executed, and sets the direction for image changing.

By changing the processing according to the up or down direction and left or right direction of the dragging operation as described above, and by removing the finger or the like from the touch panel while adjusting the number of images to be changed, it is possible to easily cancel the image changing. Furthermore, conventionally, when the user unintentionally touched the touch panel, that touch could have become a dragging operation and image changing would be executed. However, by executing image changing when the direction of the dragging operation is changed as described above, it is possible to reduce this kind of problem. In the example illustrated in FIG. 5C, even after the direction of the dragging operation has been changed, the number of images to be changed is displayed. However, even without performing this display, it is of course possible to obtain the effect above by executing image changing according to changing the direction of the dragging operation.

In the embodiment above, the number of images to be changed and the destination image are specified by performing the dragging operation in the up or down direction, and when the dragging operation is performed in either the left or right direction, specification of the number of images to be changed is set. However, the invention is not limited to this embodiment, and for example, it is possible to set the image changing in the forward direction (addition direction) when, after performing the dragging operation in the up direction (addition direction), the dragging operation is performed in either the left of right direction. Similarly, it is also possible to set image changing in the backward direction (subtraction direction) even when, after performing the dragging operation in the down direction (subtraction direction), the dragging operation is performed in either the left or right direction.

Moreover, in the embodiment described above, when the dragging operation is performed in a specified direction that corresponds to backward changing (here, this is the right direction) after performing the dragging operation in the up direction (addition direction), image changing is not executed. Similarly, when the dragging operation is performed in a specified direction that corresponds to forward changing (here, this is the left direction) after performing the dragging operation in the down direction (subtraction direction), image changing is not executed. However, it is also possible to increase or reduce the amount of image changing by performing the dragging operation in the up or down direction, and perform forward changing when the dragging operation is performed in the left direction, for example, and perform backward changing when the dragging operation is performed in the left direction. In other words, after the user has set the number of images to be changed by performing the dragging operation in either the up direction or down direction, it is possible to set either forward changing or backward changing by selecting either to perform the dragging operation in the left or right direction. As a result, the user is able to select whether to perform forward changing or backward changing while adjusting the number of images to be changed by performing the dragging operation in either the up or down direction. In the processing in the flowcharts illustrated in FIG. 9 to FIG. 11 and that will be described later, after the amount of image changing has been set by performing the dragging operation in the up or down direction in this way, forward changing or backward changing is performed according to whether the dragging operation is performed in the left or right direction.

Moreover, at this time, when the dragging operation is performed in the up or down direction, it is also possible to display both a thumbnail image of an image that is displayed when forward changing is performed and a thumbnail image of an image that is displayed when backward changing is performed. As a result, the user is able to check the image that would be displayed in both the case of forward changing and backward changing, and to select either forward or backward changing.

As will be described later, the display control illustrated in FIG. 5C has a dragging direction determination algorithm that determines the dragging operation in the up and down direction, as well as the dragging operation in other directions. When, according to this algorithm, it is determined that the dragging operation is in the up or down direction, processing moves to the image changing amount addition/subtraction mode, and displays on the left side of the touch position a current image changing amount 701 (number of images) that is stored in an image changing amount storage area in the DRAM 205. When, at a dot detected according to resolution of the touch panel, it is determined that the dragging operation exceeded a specified number of continuous dots Li, the image changing amount is increased or decreased by adding or subtracting one image for each Li. In this embodiment, it is assumed that at least one image is stored in the image changing amount storage area as the number of images to be changed, and when dragging is performed in the left or right direction even though the distance of the dragging operation in the up or down direction has not reached L1 above, the image is changed one image. In this embodiment, it is assumed that the amount of one image is added or subtracted per each dragging operation of Li=10 dots in the up or down direction. In this embodiment, the image changing amount is increased or decreased linearly with respect to the movement amount, however, it is also possible to set a table in advance in the ROM 202 that correlates the movement amount and the image changing amount, and to discretely control the image changing amount with respect to a specified movement amount, for example 1→2→3→5→10. Furthermore, it is also possible to change the image changing amount with respect to the movement amount according to the number of images stored in the memory.

In the dragging operation to the left illustrated in FIG. 5C, the dragging operation in the up or down direction above and dragging operations in other directions are distinguished, and when it is determined that the dragging operation is other than the dragging operation in the up or down direction, processing moves from the image changing amount addition/subtraction mode to the normal mode. In this normal mode, it is determined whether or not to perform processing as described above for following the dragging operation and moving the digital image in the horizontal direction, and whether to perform forward changing or backward changing after the touch pen has been separated from the touch panel. This differs from the forward changing described above in that the image changing amount when it is determined to perform the forward changing is an advancement amount that is stored in the image changing amount storage area.

The example illustrated in FIGS. 5A to 5C is an example in which when image changing is performed, the display is switched from the currently displayed image to an imaged specified by an instruction from the user. However, the present invention is not limited to this, and the case is also possible wherein an image that is specified by an instruction from the user is displayed together with the currently displayed image. Furthermore, an example was given of performing the image changing in a state wherein an image stored on the memory card is displayed, however, the present invention is not limited to this, and it is also possible to perform the image changing in an arbitrary display state. For example, when the memory card is mounted, instead of displaying the first image on the memory card, it is also possible to perform an arbitrary display, and for the image changing to include that first image.

Figure 6:
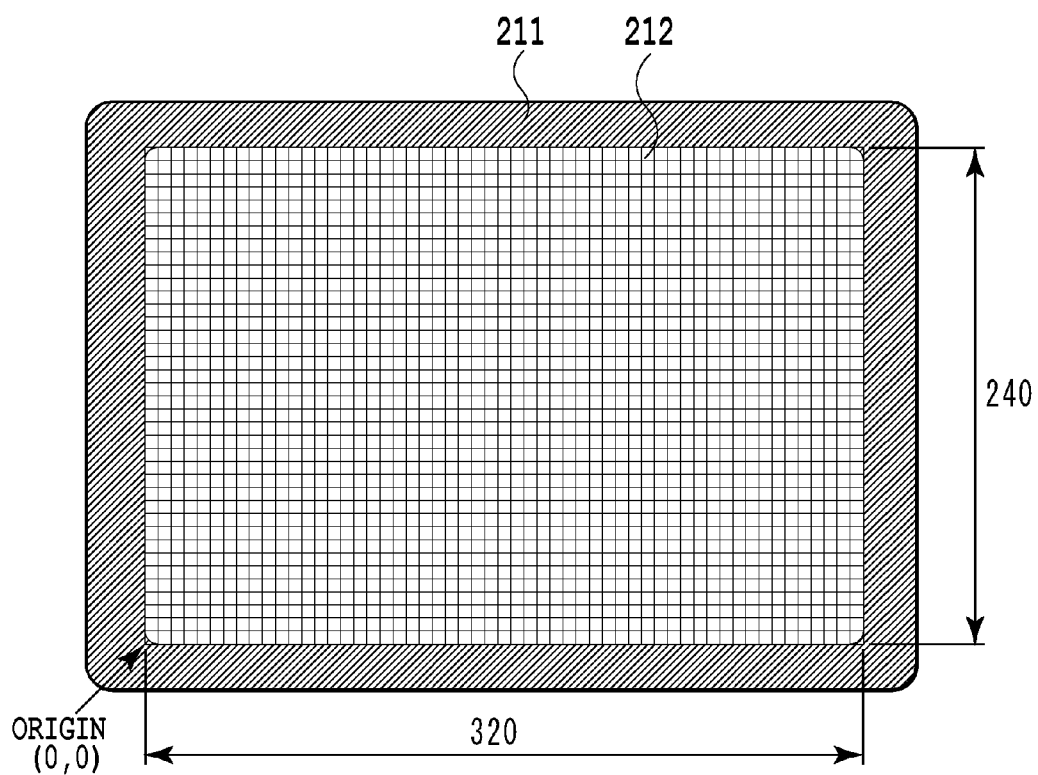
FIG. 6 is a diagram for explaining the construction of the touch panel of the embodiment.

FIG. 6 is a diagram illustrating construction of the touch panel and display device that are used in the MFP of this embodiment. In this embodiment, the display device 211 and pressure sensitive touch panel 212 are configured to overlap (the touch panel 212 is located on top). The touch panel 212 is made of a transparent material, and as illustrated in FIG. 6, has a coordinate plane in which the X-axis direction and Y-axis direction are orthogonal. The coordinates correspond to a resolution at which pressure experienced from the touch pen or user's finger is detected, and in this embodiment, the overall resolution of the touch panel is 320 dots in the horizontal direction, and 240 dots in the vertical direction, with the origin of the coordinate system being located in the lower left. Analog coordinate voltage that corresponds to coordinates of a dot is sent to the data processing circuit 213 (FIG. 1) at specified cycles. In this embodiment, the voltage is detected at cycles of 30 ms, and whether or not a user has touched the touch panel is determined by detecting a change in voltage that occurs when the user touches and applies pressure to the touch panel. By specifying a position where there is a change in voltage on the touch panel, it is possible to know coordinates corresponding to the position where the user is touching the touch panel at that time. When the analog coordinate voltage is inputted to the CPU 201 from the data processing circuit 213, the CPU 201 performs A/D conversion of this voltage to digital coordinate data, and stores the coordinates in a coordinate data storage area in the DRAM 205. The type of the touch panel is not limited to a pressure sensitive type that detects pressure from the user based on the change in voltage as described above, and may be a so-called electrostatic type panel that detects whether or not there is an instruction to the touch panel from a user or detects a position of that instruction from a change in electrostatic capacity.

Figure 7:
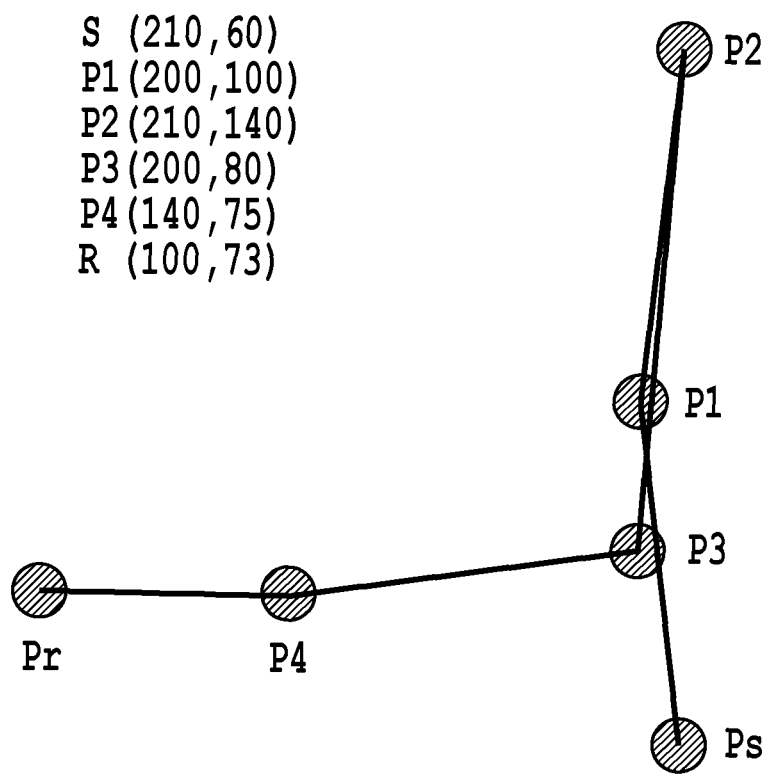
FIG. 7 is a diagram illustrating the time sequence of the tracks of a touch position that is periodically detected during a dragging operation.

FIG. 7 is a diagram illustrating an example of a track of the dragging operation that is detected every 30 ms. The starting point of the touch is a point Ps, and after that, dragging passes through points P1 to P4 and reaches point Pr, where at point Pr touching ends (a user removes the touch pen, the finger or the like from the touch panel and the detection is no longer executed). In other words, these points are detected every 30 ms as positions that are touched. Then, whether or not the user performed the dragging operation, as well as the direction and distance of that operation is calculated, based on the coordinates of these points.

In the following, the process of determining the direction and the distance of the dragging operation that is performed during the image changing described above in FIGS. 5A to 5C is explained with reference to FIG. 8A to FIG. 11. In this embodiment, constants used for the following explanation are threshold values Lv and Lh for the direction (slope) of the dragging operation, where Lv=9 and Lh=3. Moreover, the threshold value Wlimit for whether or not the image changing is executed is taken to be Wlimit=30 dots, and the threshold value Li for adding to or subtracting from the image changing amount is taken to be Li=10 dots.

Figure 8A:
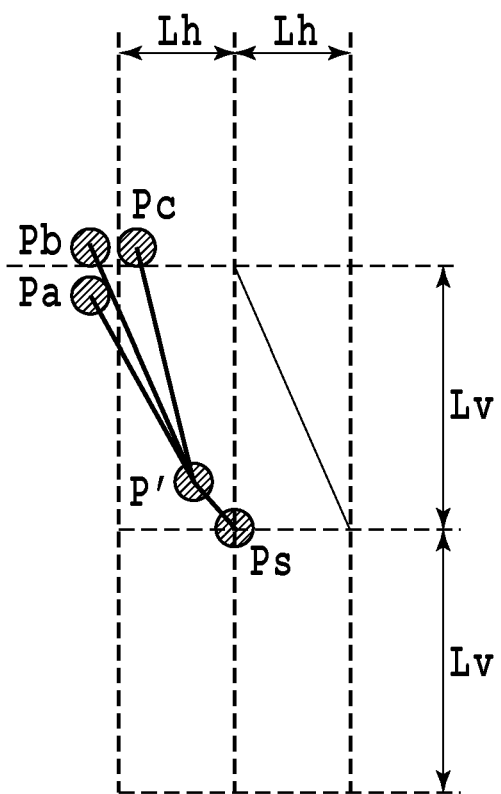
FIGS. 8A and 8B are a diagram and a flowchart illustrating the process in the image advance processing of one embodiment of the present invention of determining whether dragging is in the up or down direction or in the left or right direction.
Figure 8B:
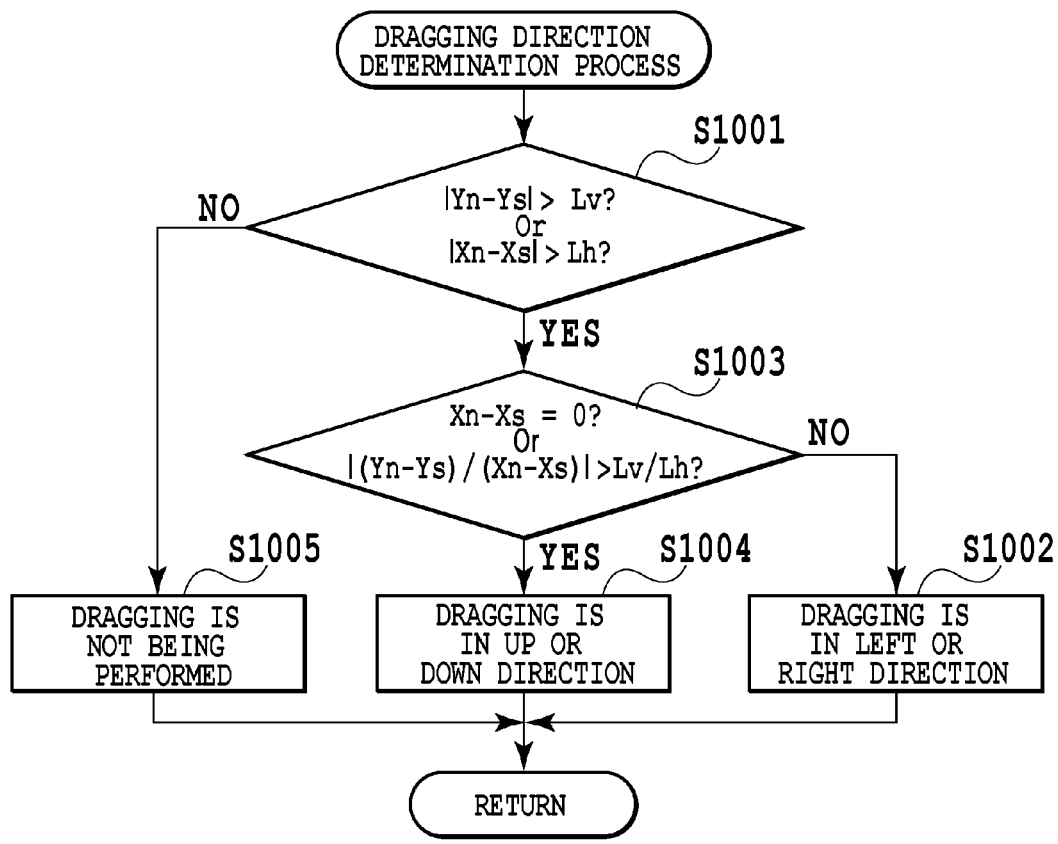

FIGS. 8A and 8B are a diagram and a flowchart that illustrates a dragging direction determination algorithm for distinguishing between a dragging operation in the up or down direction, and other dragging operations. In this embodiment, the program for executing the process of this flowchart is stored in the ROM 202, and by the CPU 201 reading the program from the ROM 202 and executing the program, it is possible to achieve the processing illustrated in the flowchart.

As illustrated in FIG. 8A, for a point (for example point P') that is detected at a specified cycle after the starting point Ps is detected, it is determined in step S1001 in FIG. 8B whether or not absolute differences in the X and Y coordinates between a point Ps (Xs, Ys) and a point P' (Xn, Yn) are greater than the threshold values Lh, Lv. When either of these conditions is not satisfied, it is determined that the dragging is not being performed (S1005).

On the other hand, it is assumed that the point P' serves as the point Ps as the starting point, and by the dragging operation, one of points Pa, Pb and Pc is detected. In this case as well, first, in step S1001, absolute values of the differences in X and Y coordinates between one of these points and the point Ps are compared with the threshold values Lh and Lv. In the relationship between any of these points and the point Ps, one of the absolute values of the differences in the X and Y coordinates is greater than the threshold value Lh or Lv, and therefore processing moves to step S1003. Then, in step S1003, the slopes of respective lines through the points Pa and Pb and the point Ps are less than the specified slope threshold value Lv/Lh, so it is determined that the dragging is performed in the left or right direction (step S1002). On the other hand, the slope of the line through the point Pc and the point Ps is greater than the specified slope Lv/Lh, the slope for point Pc is determined to be in the up or down direction (step S1004).

Figure 9:
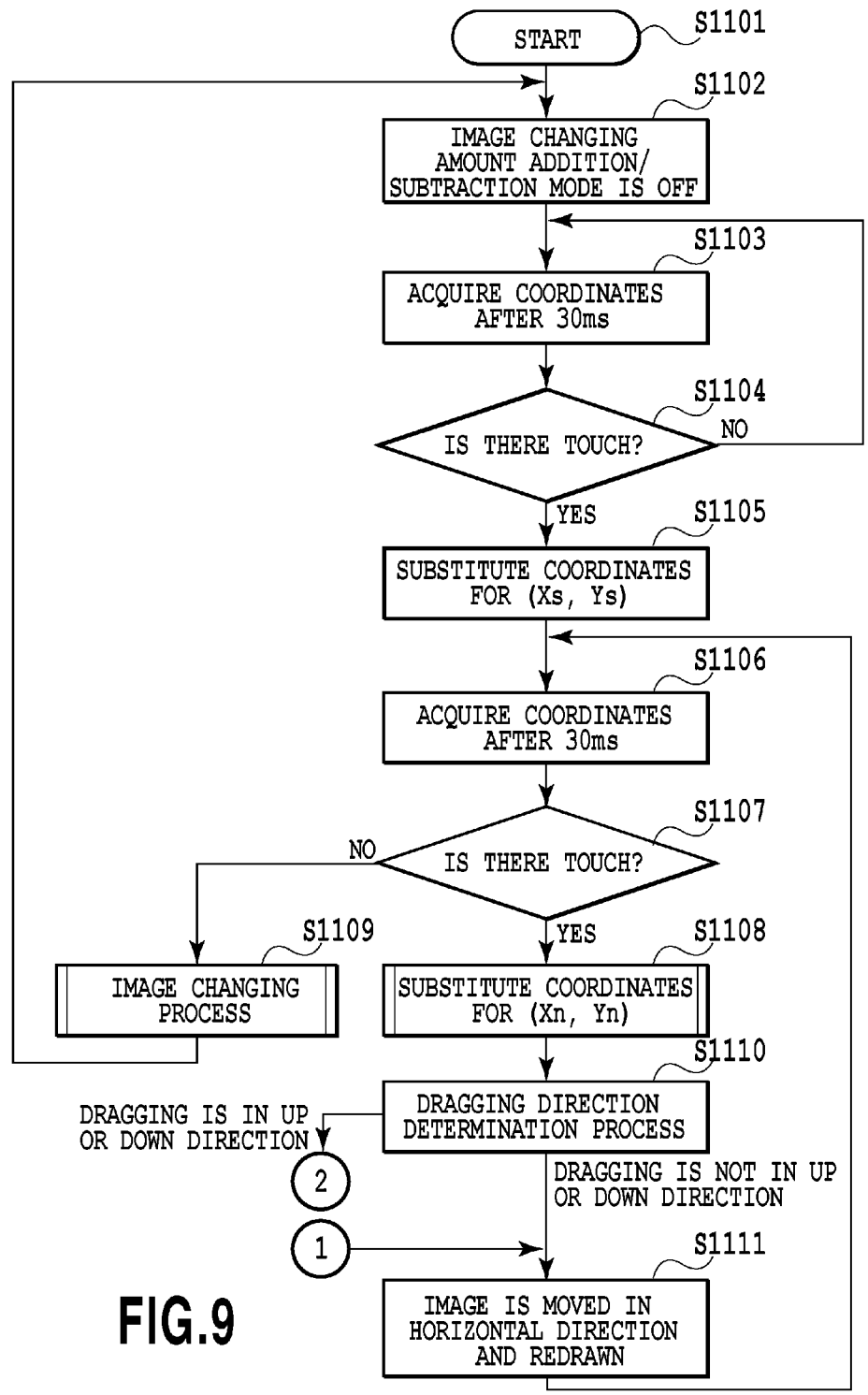
FIG. 9 is a flowchart illustrating the image changing processing on the touch panel of one embodiment of the present invention.
Figure 10B:
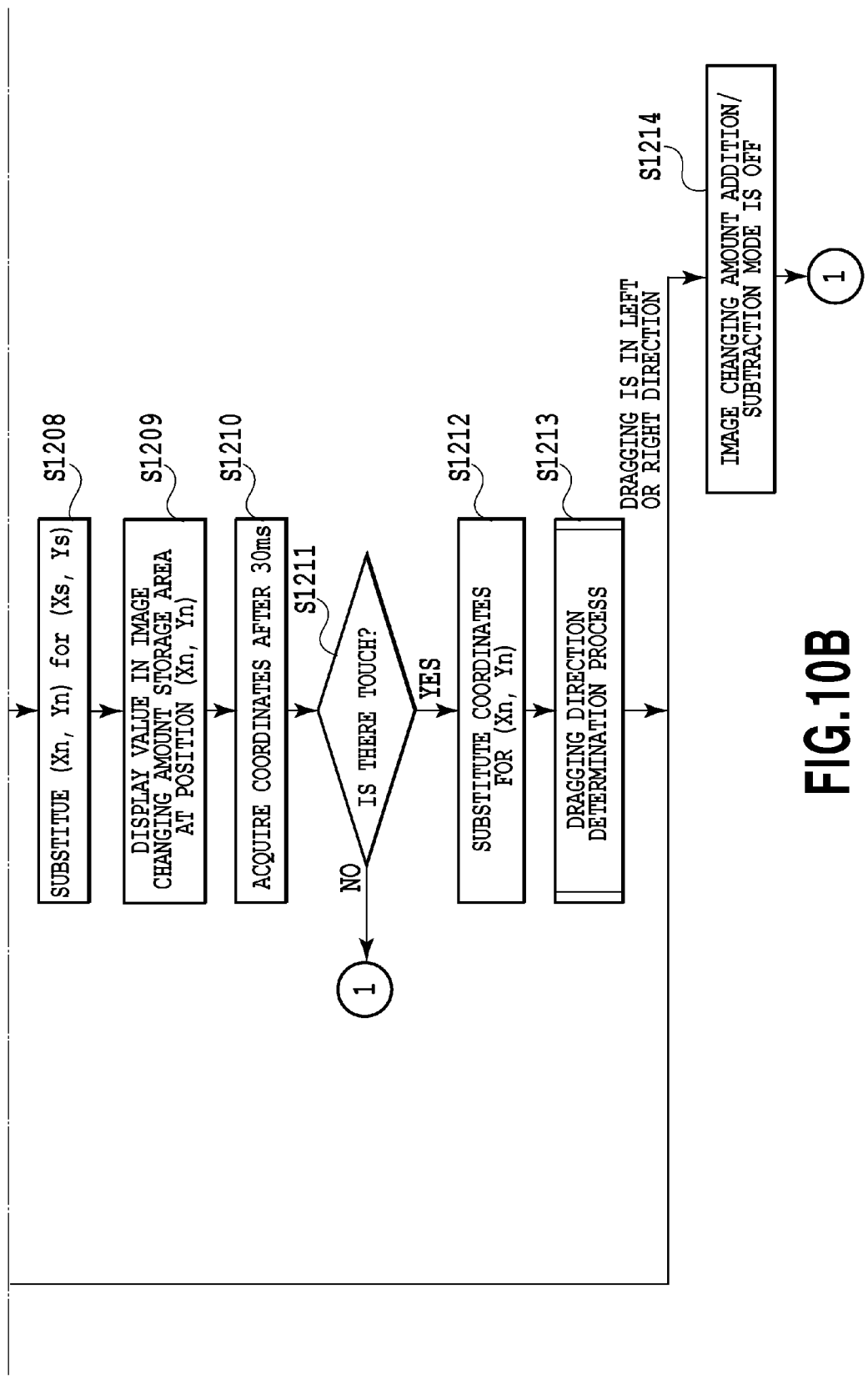
FIG. 10 is a diagram showing a relationship between FIGS. 10A and 10B, and FIGS. 10A and 10B are flowcharts illustrating the processing in the image changing processing above when it is determined that dragging is in the up or down direction.
Figure 11:
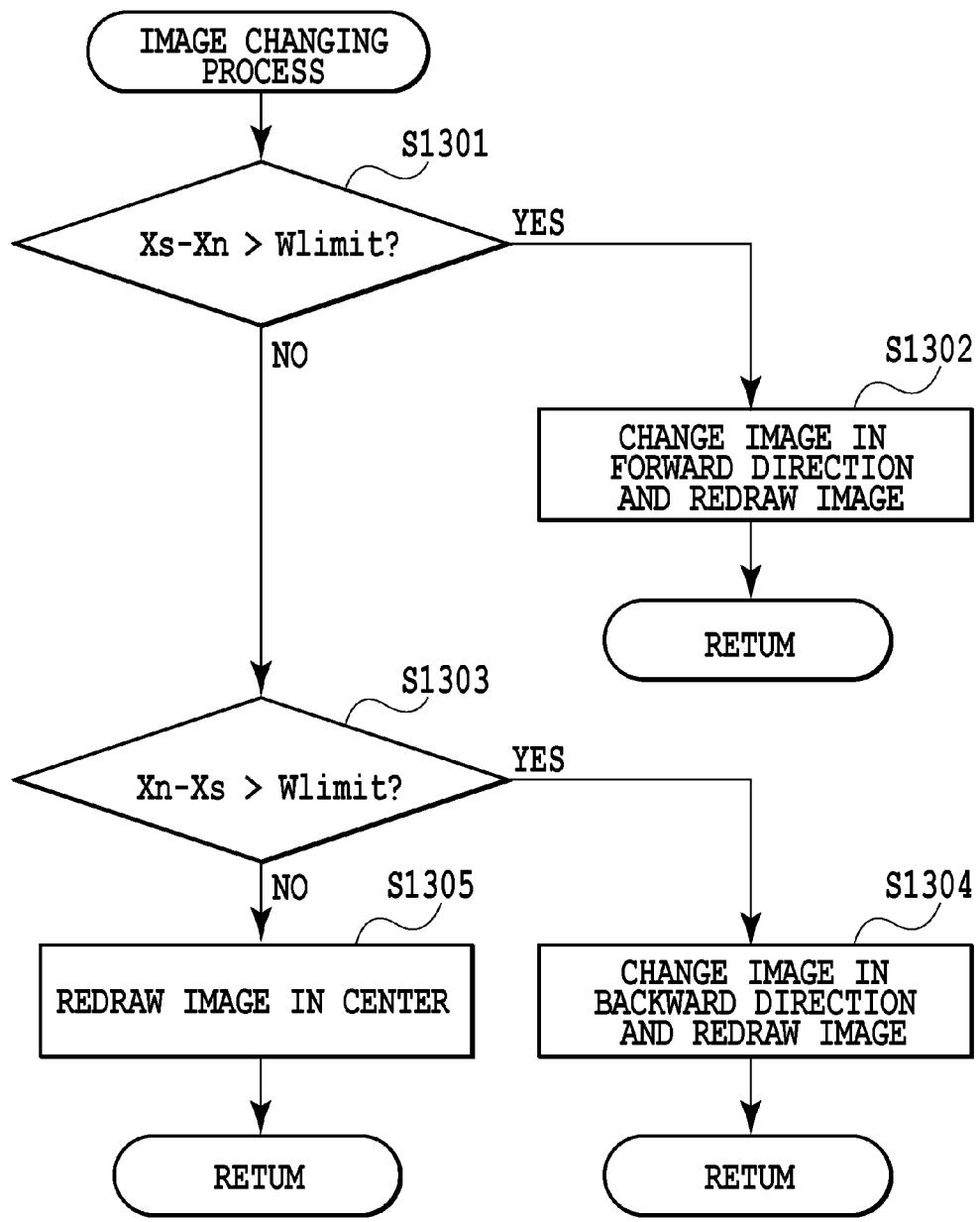
FIG. 11 is a flowchart illustrating the processing in the image changing processing above when a touch pen is separated from the touch panel.

FIG. 9 is a flowchart illustrating the processing for the dragging operation described above in FIGS. 5A to 5C, and is processing that is started when the power for the MFP is turned ON. The processing of step S1110 in FIG. 9 is the processing described above in FIG. 8B. FIGS. 10A and 10B are flowcharts illustrating the processing of addition or subtraction of the image changing amount when the dragging direction is determined in step S1110 in FIG. 9 to be the up or down direction. Furthermore, FIG. 11 is a flowchart illustrating the processing of step S1109 in FIG. 9.

In FIG. 9, first in step S1102, the current mode is set to a state that is not the image changing amount addition/subtraction mode. In this state, coordinates of a touched point are detected at specified cycles (every 30 ms in this embodiment) (steps S1103 to S1104). The processing of step S1003 acquires the coordinate when the power of the MFP is turned ON and after that acquires the coordinate every time when 30 ms passes from a previous acquisition of the coordinate.

Detection of Point Ps:

When the starting point Ps for the dragging operation illustrated in FIG. 7 is detected, in step S1104, it is determined that there is a touch. In step S1105, the coordinate of the point Ps (210, 60) is substituted for (Xs, Ys) as the determination starting coordinates. After that, in steps S1106 to S1107, the coordinates continue to be detected as the dragging operation is performed. In step S1006, similarly to step S1003, the coordinate is acquired after 30 ms passes from the previous acquisition of the coordinate.

Detection of Point P1:

When the point P1 illustrated in FIG. 7 has been detected (step S1107), the coordinate of the point P1 (200, 100) is substituted for (Xn, Yn), and the determination processing in step S1110 is performed. The determination processing of step S1110 is performed according to the flowchart illustrated in FIG. 8B, where first, in step S1001, it is determined that Yn−Ys=40>Lv=9, thus the processing moves to step S1003. In step S1003, since the calculation result of Xn−Xs=−10 is obtained, the comparison of |40/−10| and Lv/Lh=9/3=3 is performed, and it is determined that the dragging direction is the up or down direction (step S1004). Therefore, the processing moves to the processing illustrated in FIGS. 10A and 10B.

In FIGS. 10A and 10B, first, in step S1201, the image changing amount addition/subtraction mode is set. Next, in step S1202, an image is drawn again in the center. Then, in step S1203, Yn−Ys (=40), which is the movement amount in the up or down direction, is compared with Li (=10), which is the movement amount for adding one image to the number of images to be changed. As a result of the comparison, Yn−Ys is greater than Li, and thus the processing moves to step S1204, 40/10=4 is added to the image changing amount, and this value is stored. Next, in step S1208, the coordinate of the current P' (200, 100) is substituted for (Xs, Ys). Then, in step S1209, the image changing amount is displayed in a vicinity of a touched position as illustrated in FIG. 5A. In this case, the value 4 from the dragging operation in the up or down direction is added to 1, which is the image changing amount in the initial state, and thus "5" is displayed on the display screen. The touch coordinate for the next cycle is then detected (step S1210). In step S1210, similarly to step S1003, the coordinate is acquired after 30 ms passes from the previous acquisition of the coordinate.

Detection of Point P2:

In the example illustrated in FIG. 7, here the point P2 (210, 140) is detected (step S1211), and the coordinate is substituted for (Xn, Yn) (step S1212). Next, in step S1213, the determination process for determining the dragging direction is performed again. The determination process for determining the dragging direction is performed according to the flowchart illustrated in FIG. 8B.

In this example, in step S1001 in FIG. 8B, Yn−Ys=40, and thus the processing moves to step S1003. Then in step S1003, Xn−Xs=10, and thus |40/10| is compared with 3, and it is determined that the dragging direction is the up or down direction (step S1004).

As a result, in FIGS. 10A and 10B, the processing returns again to step S1203, and compares Yn−Ys (=40) with Li (=10). In this comparison as well, Yn−Ys is determined to be greater than Li, the processing moves to step S1204, 40/10=4 is added to the image changing amount (5+4=9), and this value is stored. Next, in step S1208, the coordinate (210, 140) of P' at that time is substituted for (Xs, Ys). Then, in step S1209, the image changing amount "9" that is stored for the touched position at that time is displayed as illustrated in FIG. 5A (in this case "9" is displayed), and the dragging coordinate for the next cycle is detected (step S1210).

Detection of Point P3:

Next, in the example illustrated in FIG. 7, the point P3 (200, 80) is detected (step S1211) and the touch coordinate (200, 80) at that time is substituted for (Xn, Yn) (step S1212). Next, in step S1213, the determination process for determining the dragging direction is performed again. In FIG. 8B that illustrates this processing, in step S1001, it is determined that Yn−Ys=−60, and the processing moves to step S1003. In step S1003, since Xn−Xs=−10, |60/10| is compared with 3, and it is determined that the dragging direction is the up or down direction (step S1004).

As a result, the processing moves to step S1203 in FIGS. 10A and 10B, to compare Yn−Ys (=−60) with Li (=10). In this comparison, Yn−Ys is equal or less than Li and the processing moves to step S1205 to compare Yn−Yc (=60) with Li (=10). In this comparison, Ys−Yn is greater than Li and thus the processing moves to step S1206. Then, the processing subtracts 60/10=6 from the current image changing amount to obtain the resulting amount (9−6=3) and stores the resulting value. In this case, in step S1207, when the stored value is 0 or less, the value is stored as 1.

Next, in step S1208, the coordinate (200, 80) of P' at that time is substituted for (Xs, Ys). Then, in step S1209, the image changing amount 3 that is stored for the current touch position is displayed as illustrated in FIG. 5A (in this case, "3" is displayed), and the dragging coordinate for the next cycle is detected (step S1210).

Detection of Point P4:

Next, in the example in FIG. 7, the point P4 (140, 75) is detected (step S1211). Then, the coordinate (140, 75) is substituted for (Xn, Yn) (step S1212). Next, in step S1213, the determination process for determining the dragging direction is again performed. In FIG. 8B that illustrates this process, in step S1001, it is determined that Xn−Xs=60, and the processing moves to step S1003. In step S1003, Yn−Ys=−5, and thus |−5/−60| is compared with 3, and as a result of the comparison, it is determined that the dragging direction is the left or right direction (step S1002).

In FIGS. 10A and 10B, if the dragging direction is determined to be the left or right direction, in step S1214, the mode is set to a state that is not the image changing amount addition/subtraction mode, and the processing moves to step S1111 in FIG. 9. In the case of this mode, the coordinate which is acquired last during the dragging operation in the up or down direction is set to be a start coordinate for the dragging operation in left or right direction. That is, the coordinate (Xs, Ys) determined in step S1208 is set to be the start coordinate for the dragging operation in left or right direction. In this example, the coordinates (200, 80) of the point P3 are set for (Xs, Ys). The mode is no longer the image changing amount addition/subtraction mode, and therefore the display image is moved in the horizontal direction and drawn (step S1111; the display state illustrated in FIG. 4A), and the touch coordinates for the next cycle are detected (step S1106).

If the coordinate of a position which is first touched by a user in step S1104 is (X0, Y0), a process drawing a display image in step S1111 draws the display image on a position that is shifted by (Xn−X0) in a horizontal direction from an initial position on which the display image was displayed. Furthermore, if touch to the touch panel by a user is determined that the dragging operation is not being performed in step S1005 shown in FIG. 8B, the process in step S1111 may move the display image in the horizontal line or may not move the display image.

Detection of Point Pr:

Next, in the example in FIG. 7, the point Pr (100, 73) is detected (step S1107). Then the coordinate (100, 73) is substituted for (Xn, Yc) (step S1108) and the determination of step S1110 is performed. In FIG. 8B that illustrates this determination, first, in step S1001, it is determined that Yn−Ys=73−80=−7, and Xn−Xs=100−200=−100, and the processing moves to step S1003. In step S1003, since Xn−Xs=−100, |−7/−100| is compared with 3, and then the dragging direction is determined to be the left or right direction (step S1002). By this, the display image is moved in the horizontal direction to be drawn (step S1111; the display state illustrated in FIG. 4B), and the touch coordinate for the next cycle is detected (step S1106).

Processing when Touch Pen is Removed:

By removing the touch pen, the result of the determination in step S1107 is that there is no touch, and the processing moves to step S1109. FIG. 11 is a flowchart illustrating processing of step S1109. In this process, the image changing is performed according to the image changing amount that was set according to the flowchart illustrated in FIGS. 10A and 10B. Here, regardless of whether the image changing amount is increased or decreased by the dragging operation in either the up or down direction, when the dragging operation is performed in the left direction, forward changing is performed, and when the dragging operation is performed in the right direction, backward changing is performed. However, as is described referring to FIGS. 5A to 5C, after dragging in the up direction (addition direction) or down direction (subtraction direction), if it is determined that the dragging is performed in the left or right direction, which is the reversed direction to the specified direction respectively, the image changing process may be cancelled. In this case, when the image changing process is cancelled, processing of drawing the image in the center of the display screen is performed. After the above initial processing, in step S1301, for forward changing, Xs−Xn=200−100=100 is compared with the image changing threshold value Wlimit=30 that is explained in FIGS. 4A and 4B. The result of the comparison is that Xs−Xn is greater than the threshold value Wlimit, and therefore the processing moves to step S1302. Then the image changing in the forward direction is performed by 3 images according to the value 3 of the image changing amount at that time. As a result, in a case that the first image is displayed as illustrated in FIG. 5A in the initial state of S1101 in FIG. 9 for example, the fourth image is displayed as illustrated in FIG. 5C.

In step S1301, if it is determined that the dragged amount Xs−Xn is equal to or less than the threshold value Wlimit, in step S1303, for backward changing, the dragged amount Xn−Xs is compared with the threshold value Wlimit. Here, if Xn−Xs is determined to be greater than Wlimit, in step S1304, the image changing in the backward direction is executed according to a value of the changing amount displayed at that time. When |Xs−Xn| is less than the threshold value Wlimit, and NO is determined in both steps S1301 and S1303, in step S1305, the image being dragged is returned to the center of the display screen and displayed, and this processing ends.

Moreover, if the touch pen is removed from the touch panel after the mode is set to the image changing amount addition/subtraction mode as illustrated in FIGS. 10A and 10B (NO in step S1211), the image changing is not performed unless the dragging is performed in the left or right direction, in other words, the image changing is cancelled.

In the embodiments explained above, examples are given in which when changing the direction of the dragging operation, the dragging operation is performed continuously while touching the touch panel. However, the invention is not limited to this aspect. For example, after performing the dragging operation in the up or down direction and setting the number of images to be changed, it is also possible to store that number for a specified amount of time, and when the dragging operation is performed in the left or right direction within that time, the image may be changed by stored number of images. When the dragging operation in the left or right direction is not performed within that specified amount of time, the image changing is cancelled.

Moreover, in the embodiments above, in order to adjust the amount of image changing and to be changed the image, the user gave an instruction of distance and direction on the display screen using a dragging operation. However, the present invention is not limited to this aspect. For example, even when the user does not continuously give an instruction such as during a dragging operation, the user may be only required to be able to specify two points on the display screen. In other words, when the user specifies an arbitrary point on the display screen, and after that specifies another point on the display screen, it is possible to determine the distance and direction on the display screen according to the distance and positional relationship between those two points.

Furthermore, in the embodiments above, the dragging operation in the up or down direction is correlated with the adjustment of the image changing amount. However, the present invention is not limited to this aspect, and it is also possible to correlate this adjustment with a dragging operation in the left or right direction. Moreover, the dragging operation that corresponds to the direction of the image changing amount can be any direction, and image changing can be performed when a dragging operation in a different direction than that dragging operation is determined. In other words, by the user adjusting the image changing amount by performing a dragging operation in an arbitrary direction, image changing can be performed by performing a dragging operation in a direction different than that dragging operation. Therefore, even though the user does not know the direction of the dragging operation for performing adjustment of the image changing amount, it is possible to perform the adjustment of the image changing amount.

The invention is not limited to the case of giving an instruction for the distance and direction between two points on the display screen, and, for example, it is also possible to detect the intensity of pressure on the touch panel and to increase or decrease the image changing amount according to that intensity. In other words, after the user adjusts the amount of advancement by the intensity of pressure on the touch panel, image changing can be executed by performing a dragging operation in a specified direction (for example, left or right direction). Furthermore, it is also possible to increase the image changing amount according to the time that the touch panel is touched, or according to the surface area of the place where the touch panel is touched.

Moreover, in the explanation above, an example is given of performing an operation of dragging an image by using the touch pen or the like on the touch panel, however, the present invention is not limited to this. For example, it is also possible to use a mouse and displayed cursor as the position input device, and to perform the dragging operation on the display screen by way of the cursor. Furthermore, the invention is not limited to a dragging operation, and it is also possible to specify two points on the display screen as described above, and to specify the image changing amount and give an instruction to perform image changing according to the distance and positional relationship between those two points.

In the embodiments explained above, display control for the MFP apparatus is explained. However, of course application of the present invention is not limited to such embodiments. For example, a normal printer that does not comprise an image sensor and comprises the display device and control device described above. Any of various information processing apparatuses such as a personal computer can perform the display control described above on a display screen of a display device that is connected to that information processing device.

Furthermore, in the embodiments above, display of the number of images to be changed is performed by performing a dragging operation in the up or down direction, and after that, by performing a dragging operation in the left or right direction, the images are changed based on the displayed number of images to be changed. However, the invention is not limited to such embodiments. After displaying the number of images to be changed by performing a dragging operation in a specified direction such as the up or down direction or the left or right direction, it is also possible to execute image changing by removing the touch pen for example. In that case, it is possible to set a method for image changing beforehand, such that forward changing is performed for a dragging operation in the up direction, and backward changing is performed for a dragging operation in the down direction. Even after the dragging operation has been performed, image changing can be made to be cancelable by removing the touch pen near the position that was first specified on the display screen. In this embodiment, it is at least possible to obtain the effect of the user being able to perform dragging operation and know the number of images to be changed according to that operation. Moreover, by displaying a thumbnail image of a destination image after image changing, it becomes easy to directly identify a target image by performing a dragging operation.

In the embodiments above, the data to be displayed is an image of an image file. However, the present invention is not limited to this, and in the case of displaying a plurality of files that were created by various applications for example, the file to be displayed can be selected. In the case where pages of a file that was created by a document application or the like are set, it is also possible to select a page to be displayed.

Moreover, the invention is not limited to, after data has been selected according to an instruction from the user, displaying the selected data. For example, according to this embodiment, when a user has selected a desired image from among a plurality of images, it is also possible to print the selected imaged by a printing device. In addition to this, when a desired music file is selected from among a plurality of music files by a user, it is also possible to output audio according to the selected music file.

Other Embodiments

The present invention can also be achieved by executing the following processing. That is, processing in which software (program) that makes possible the functions of the embodiments described above is provided to a system or device via a network or various kind of storage media, and a computer of that system or device reads and executes the program. The present invention is not limited to the case of executing processing with one processor, but can also be achieved when the processing is executed by a plurality of processors working together.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-231638, filed Oct. 14, 2010, which is hereby incorporated by reference herein in its entirety.

What is claimed is:

1. A display control apparatus comprising:
   a specifying unit configured to specify a position on a display screen which is designated by a user's instruction;
   a first display control unit configured to cause a display screen to display information based on first and second positions which are specified by said specifying unit, the information indicating data to be displayed among a plurality of items of data;
   a determination unit configured to, in a case where said specifying unit specifies a third position on the display screen according to the user's instruction, determine whether the user's instruction for designating the third position is a predetermined instruction that is different from the user's instruction for designating the second position;

a second display control unit configured to, in a case where said determination unit determines that the user's instruction for designating the third position is the predetermined instruction, cause the display screen to display data corresponding to the information displayed by said first display control unit, among the plurality of items; and at least one processor configured to function as at least one of said specifying unit, said first display control unit, said determination unit, and said second display control unit.

2. The display control apparatus according to claim 1, wherein said first display control unit causes the display screen to display information indicating a number corresponding to an item of data to be displayed on the display screen, and said second display control unit causes data corresponding to the number that is displayed on the display screen by the first display control unit.

3. The display control apparatus according to claim 1, wherein the plurality of items of data are a plurality of images stored in a memory, and said first display control unit causes the display screen to display a thumbnail image of an image corresponding to the first and second positions, and said second display control unit causes an image corresponding to the thumbnail image displayed on the display screen among the plurality of images stored in the memory to be displayed on the display screen.

4. The display control apparatus according to claim 1, wherein said first display control unit causes the display screen to display information corresponding to a distance between the first and second positions on the display screen.

5. The display control apparatus according to claim 1, wherein said specifying unit specifies a move designated by the user on the display screen from the first position, to the second position, and a move from the second position to the third position.

6. The display control apparatus according to claim 5, wherein said determination unit determines whether the user's instruction for designating the third position is the predetermined instruction, based on a direction of move from the second position to the third position on the display screen.

7. A non-transitory storage medium storing a program that is read by a computer to cause the computer to function as the display control apparatus according to claim 1.

8. The display control apparatus according to claim 1, wherein the display screen is displayed by a touch panel, and said specifying unit specifies a position which is designated by the user in the touch panel.

9. A display control method comprising the steps of:
specifying a position on a display screen which is designated by a user's instruction;
causing a display screen to display information based on first and second positions which are specified, the information indicating data to be displayed among a plurality of items of data;
determining, in a case where a third position on the display screen is specified according to the user's instruction, whether the user's instruction for designating the third position is a predetermined instruction that is different from the user's instruction for designating the second position; and
causing, in a case where it is determined that the user's instruction for designating the third position is the predetermined instruction, the display screen to display data corresponding to the displayed information, among the plurality of items.

10. An apparatus comprising:
a first display control unit configured to cause a display screen to display, in a case where a drag operation is performed by a user, information indicating data corresponding to a distance of the drag operation among a plurality of items of data;
a second display control unit configured to, in a case where an operation to the information is performed by a user when the information is displayed by the first display control unit, cause the display screen to display data corresponding to the information;
at least one processor configured to function as at least one of said first display control unit and said second display control unit; and
a memory configured to store a program,
wherein the at least one processor functions as at least one of said first display control unit and said second display control unit by executing the program stored in the memory.

11. The apparatus according to claim 10, wherein in a case where a drag operation corresponding to a first direction is performed by a user, the first display control unit causes the display screen to display the information, and
wherein in a case where a drag operation corresponding to a second direction is performed by a user when the information is displayed, said second display control unit causes the display screen to display the data corresponding to the information.

12. The apparatus according to claim 11, wherein in a case where the drag operation corresponding to the second direction is performed in succession to the drag operation corresponding to the first direction, said second display control unit causes the display screen to display data corresponding to the information.

13. The apparatus according to claim 12, wherein in a case where the information is displayed according to the drag operation corresponding to the first direction and the drag operation performed by the user is completed before the drag operation corresponding to the second direction is performed, said second display control unit does not cause the display screen to display the data corresponding to the information.

14. The apparatus according to claim 10, wherein the display screen has a touch panel and the drag operation is performed by the user on the touch panel.

15. A method comprising the steps of:
causing a display screen to display, in a case where a drag operation is performed by a user, information indicating data corresponding to a distance of the drag operation among a plurality of items of data; and
causing, in a case where an operation to the information is performed by a user when the information is displayed by the display screen, the display screen to display the data corresponding to the information.

16. The method according to claim 15, wherein in the case where the drag operation performed by the user corresponds to a first direction, the display screen is caused to display the information, and
wherein in a case where the drag operation performed by the user when the information is displayed corresponds to a second direction, the display screen is caused to display the data corresponding to the information.

17. The method according to claim 16, wherein in a case where the drag operation corresponding to the second direction is performed in succession to the drag operation corresponding to the first direction, the display screen is caused to display data corresponding to the information.

18. The method according to claim 17, wherein in a case where the information is displayed according to the drag operation corresponding to the first direction and the drag operation performed by the user is completed before the drag operation corresponding to the second direction is performed, the display screen is not caused to display the data corresponding to the information.

19. The method according to claim 15, wherein the display screen has a touch panel, and the drag operation is performed by the user on the touch panel.

20. A non-transitory storage medium storing a program that is read by a computer to cause the computer to execute the method according to claim 15.

* * * * *